(12) United States Patent
Yamazaki et al.

(10) Patent No.: US 11,594,740 B2
(45) Date of Patent: Feb. 28, 2023

(54) SEALING GASKET FOR CYLINDRICAL ALKALINE BATTERY AND CYLINDRICAL ALKALINE BATTERY

(71) Applicant: FDK CORPORATION, Tokyo (JP)

(72) Inventors: Tatsuya Yamazaki, Tokyo (JP); Shigeyuki Kuniya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 44 days.

(21) Appl. No.: 16/440,964

(22) Filed: Jun. 13, 2019

(65) Prior Publication Data

US 2019/0296278 A1    Sep. 26, 2019

Related U.S. Application Data

(63) Continuation of application No. PCT/JP2017/044548, filed on Dec. 12, 2017.

(30) Foreign Application Priority Data

Dec. 19, 2016  (JP) .............................. JP2016-245146

(51) Int. Cl.
*H01M 6/08*    (2006.01)
*H01M 50/30*    (2021.01)
(Continued)

(52) U.S. Cl.
CPC ............. *H01M 6/085* (2013.01); *H01M 6/08* (2013.01); *H01M 50/184* (2021.01);
(Continued)

(58) Field of Classification Search
CPC ............ H01M 2/08; H01M 2/30; H01M 2/34; H01M 4/24; H01M 10/24; H01M 2/1241;
(Continued)

(56) References Cited

U.S. PATENT DOCUMENTS

2002/0090549 A1*  7/2002 Urade .................. H01M 6/085
429/174
2002/0127470 A1*  9/2002 Syvertsen ........... H01M 50/166
429/174
(Continued)

FOREIGN PATENT DOCUMENTS

CN       1679180 A    10/2005
CN     105789499 A     7/2016
(Continued)

OTHER PUBLICATIONS

Extended European Search Report (EESR) for Application No. PCT/JP2017/044548 dated Jun. 17, 2020.
(Continued)

*Primary Examiner* — Kaity V Chandler
(74) *Attorney, Agent, or Firm* — Isshiki & Partners; Joseph Farrar (57) ABSTRACT

A resin sealing gasket 10 to be incorporated in an alkaline battery 1 housing a power generation element (3 to 5) in a cylindrical battery can 2 closed at a bottom, the sealing gasket configured to insulate a top opening of the battery can and a negative electrode terminal plate 7 from each other. The sealing gasket includes: an outer periphery part 14 standing upward from the rim of a disc-shaped partition part 13; a boss part 11 in a hollow cylindrical shape enabling a rod-shaped negative electrode current collector 6 to stand at the center of the partition part; and a thin-walled portion 15 formed in a groove shape along the outer periphery of the boss part and being thinner than other portions of the partition part.

2 Claims, 5 Drawing Sheets

(51) Int. Cl.
   *H01M 50/342* (2021.01)
   *H01M 50/586* (2021.01)
   *H01M 50/593* (2021.01)
   *H01M 50/198* (2021.01)
   *H01M 50/193* (2021.01)
   *H01M 50/184* (2021.01)
   *H01M 50/186* (2021.01)
   *H01M 50/559* (2021.01)

(52) U.S. Cl.
   CPC ....... *H01M 50/186* (2021.01); *H01M 50/193* (2021.01); *H01M 50/198* (2021.01); *H01M 50/30* (2021.01); *H01M 50/3425* (2021.01); *H01M 50/559* (2021.01); *H01M 50/586* (2021.01); *H01M 50/593* (2021.01)

(58) Field of Classification Search
   CPC .. H01M 50/183; H01M 50/30; H01M 50/543; H01M 50/572; H01M 50/3425; H01M 6/08; H01M 6/085
   See application file for complete search history.

(56) References Cited

U.S. PATENT DOCUMENTS

| | | | | |
|---|---|---|---|---|
| 2003/0152831 | A1* | 8/2003 | Davidson | H01M 50/171 429/61 |
| 2004/0043286 | A1* | 3/2004 | Janmey | H01M 50/3425 429/174 |
| 2004/0191610 | A1* | 9/2004 | Yoppolo | H01M 50/3425 429/174 |
| 2006/0172193 | A1* | 8/2006 | Iwamoto | H01M 4/42 429/185 |
| 2006/0222938 | A1 | 10/2006 | Yoshioka et al. | |
| 2008/0241678 | A1* | 10/2008 | Cui | H01M 50/531 429/185 |
| 2009/0169988 | A1* | 7/2009 | Kato | H01M 50/166 429/174 |
| 2009/0181299 | A1* | 7/2009 | Kato | H01M 6/085 429/185 |
| 2009/0258292 | A1* | 10/2009 | Mushiga | H01M 50/193 429/185 |
| 2009/0263710 | A1* | 10/2009 | Kato | H01M 6/085 429/163 |
| 2010/0248019 | A1* | 9/2010 | Matsuhisa | H01M 50/10 429/185 |
| 2013/0209842 | A1* | 8/2013 | Nunome | H01M 2/0413 429/53 |
| 2014/0295229 | A1* | 10/2014 | Janik | H01M 50/3425 429/89 |
| 2017/0279098 | A1* | 9/2017 | Lee | H01M 50/3425 |

FOREIGN PATENT DOCUMENTS

| | | | |
|---|---|---|---|
| JP | H02061061 U | 5/1990 | |
| JP | H11-329383 A | 11/1999 | |
| JP | 2002075315 A | 3/2002 | |
| JP | 2005079021 A | 3/2005 | |
| JP | 2009016079 A | 1/2009 | |
| WO | 2004021470 A | 3/2004 | |
| WO | WO-2010035857 A1 * | 4/2010 | ......... H01M 50/182 |

OTHER PUBLICATIONS

International Search Report (ISR) for Application No. PCT/JP2017/044548 dated Feb. 6, 2018.
Translation of the ISR for Application No. PCT/JP2017/044548 dated Feb. 6, 2018.
Written Opinion of the International Search Authority for Application No. PCT/JP2017/044548 dated Feb. 6, 2018.
Partial translation of Written Opinion of the International Search Authority for Application No. PCT/JP2017/044548 dated Feb. 6, 2018.
FDK Corporation, "Dry Battery Manufacturing process—Process for Producing Alkaline Battery", searched on Nov. 4, 2016, Japanese Website: <http://www.fdk.co.jp/denchi_club/denchi_story/arukari.htm>; English Website: <http://www.fdk.com/cyber-e/pibtprocess.html>.
FDK Corporation,"Alkaline Battery—Premium type", searched on Nov. 4, 2016, Japanese Website:<http://www.fdk.co.jp/denchi/premium/index.html>; English Website:<http://www.fdk.com/denchi-e/alkaline_battery/premium/index.html>.
Office Action in Japanese Patent Application No. 2016-245146, dated Dec. 2, 2020.
Office Action in Japanese Patent Application No. 2016-245146, dated Jul. 28, 2021.
Translation of the Office Action in Japanese Patent Application No. 2016-245146.
Office Action in Chinese Patent Application No. 201780074726.1, dated Aug. 27, 2021.
Translation of the Office Action in Chinese Patent Application No. 201780074726.1.
Second Office Action in Chinese Patent Application No. 2017800747261, dated Feb. 25, 2022.
Translation of the Second Office Action in Chinese Patent Application No. 2017800747261.
Third Office Action in Chinese Patent Application No. 2017800747261, dated Aug. 3, 2022.
Translation of the Third Office Action in Chinese Patent Application No. 2017800747261.
Decision of Rejection in Chinese Patent Application No. 2017800747261 dated Dec. 15, 2022.
Translation of Decision of Rejection in Chinese Patent Application No. 2017800747261 dated Dec. 15, 2022.

* cited by examiner

FIG. 5

SEALING GASKET FOR CYLINDRICAL ALKALINE BATTERY AND CYLINDRICAL ALKALINE BATTERY

CROSS-REFERENCE TO RELATED APPLICATIONS

This patent application is a continuation application of International Patent Application No. PCT/JP2017/044548 filed Dec. 12, 2017, which claims the benefit of priority to Japanese Patent Application No. 2016-245146 filed Dec. 19, 2016. The entire disclosures of these applications are hereby incorporated herein by reference.

BACKGROUND

Technical Field

The present disclosure relates to a sealing gasket for a cylindrical alkaline battery and the cylindrical alkaline battery.

Description of the Related Art

Figure 1:
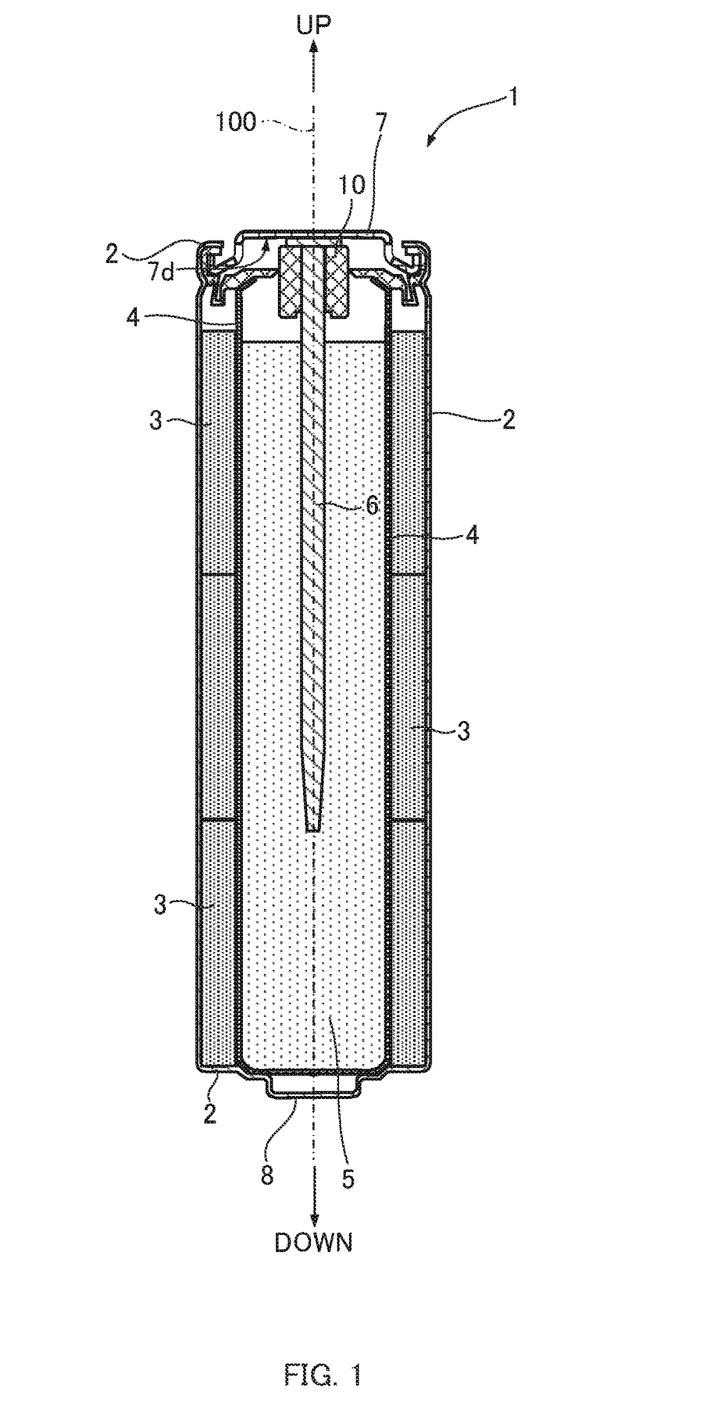
FIG. 1 is a diagram illustrating a structure of an alkaline battery.

FIG. 1 illustrates a structure of an LR6 cylindrical alkaline battery (hereinafter also referred to as the alkaline battery 1). FIG. 1 illustrates a longitudinal cross-sectional view assuming that the direction of a cylinder axis 100 is defined as the vertical (longitudinal) direction. As illustrated in FIG. 1, the alkaline battery includes a metallic tubular battery can 2 closed at a bottom, annular positive electrode mixture 3, a cylindrical separator 4 closed at a bottom, the separator disposed inside the positive electrode mixture 3, a negative electrode gel 5 containing a zinc alloy and filling the separator 4, a metallic negative electrode current collector 6 in the form of a rod to be inserted in the negative electrode gel 5, a metallic negative electrode terminal plate 7 of a dish shape, a resin sealing gasket 10, and the like. In this structure, the positive electrode mixture 3, the separator 4, and the negative electrode gel 5 form a power generation element of the alkaline battery 1 in the presence of an electrolytic solution. It should be noted that, hereinafter, the vertical direction is defined such that the bottom side of the battery can 2 is the lower side.

The battery can 2 is in direct contact with the positive electrode mixture 3, thereby acting as a positive electrode current collector, while also serving as a battery case. A positive electrode terminal 8 is formed at the bottom surface of the battery can 2. The dish-shaped negative terminal plate 7 has a shape of a dish with a flanged rim, and is crimped to the opening end portion of the battery can 2, with its bottom surface up like an inverted dish, with the sealing gasket 10 interposed therebetween. Further, the upper end of the separator 4 is in contact with the lower surface of the sealing gasket 10. Accordingly, the region in the battery can 2 housing the negative electrode gel 5 is closed, thereby preventing the negative electrode gel 5 from flowing out into the region housing the positive electrode mixture 3 and causing an internal short circuit when the alkaline battery 1 is tilted.

The rod-shaped negative electrode current collector 6 to be inserted in the negative electrode gel 5 is fixed to stand or vertically arranged on a lower surface 7d of the dish-shaped negative terminal plate 7 by welding its upper end to the lower surface 7d. Note that the negative terminal plate 7, the negative electrode current collector 6, and the sealing gasket 10 are assembled in advance into a single body as a sealing member. To assemble the alkaline battery 1, the sealing member is inserted into the opening-end-portion side of the battery can 2 with the power generation element housed therein, and the opening end portion of this battery can 2 is swaged inward. As a result, the sealing gasket 10 is held between the opening end portion of the battery can 2 and the flanged rim of the negative terminal plate 7, thereby tightly sealing the battery can 2.

Figure 2:
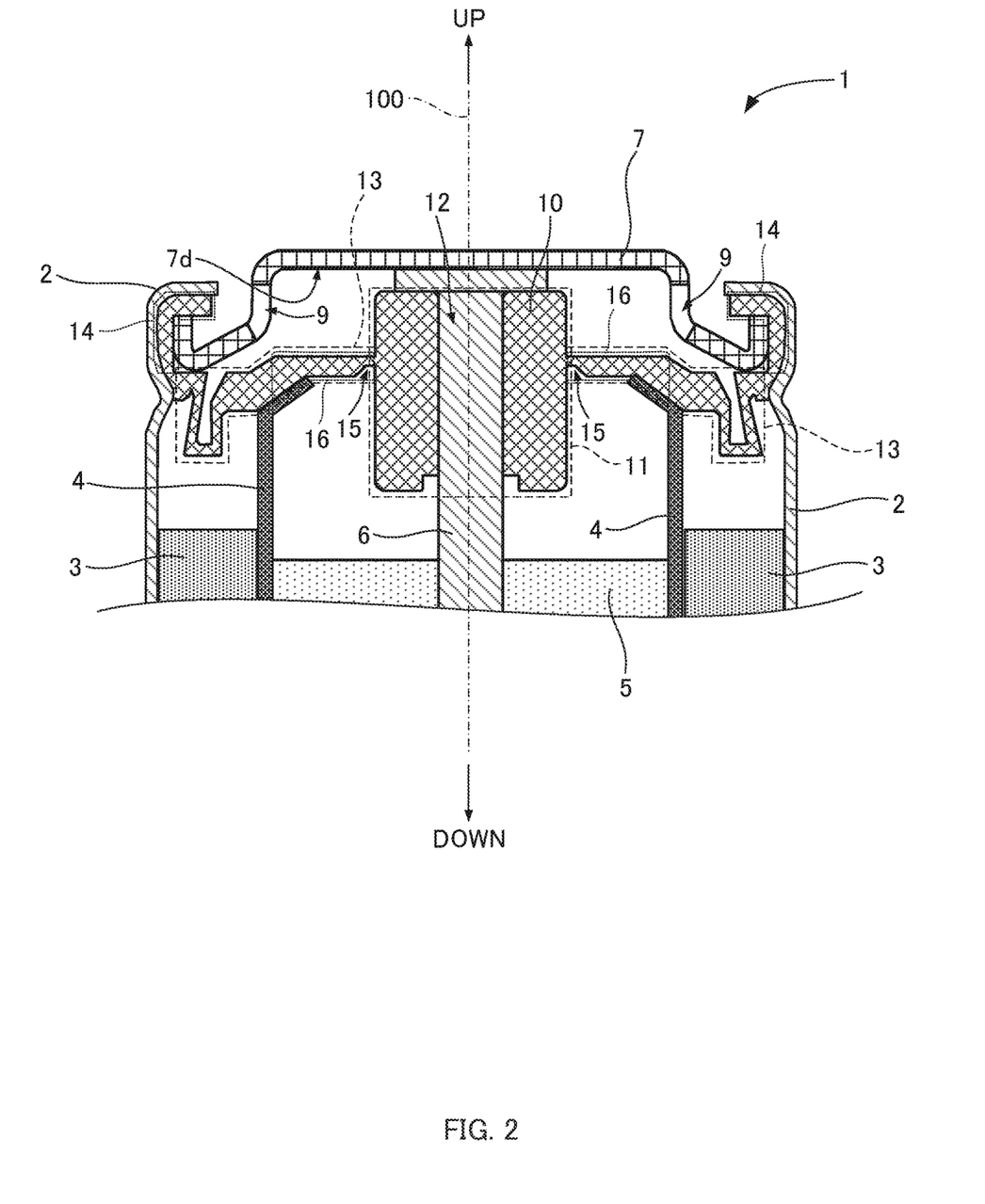
FIG. 2 is a diagram illustrating a sealing structure in an alkaline battery.

FIG. 2 is a diagram illustrating the sealing structure in the alkaline battery 1. FIG. 2 illustrates an enlarged view of a longitudinal cross section of the upper end side of the alkaline battery 1. The sealing gasket 10 is in a shape of a cup having a disc with recesses and protrusions in its surface and a wall surface (hereinafter, referred to as the outer periphery part) 14 standing upward around the disc. The center of the disc corresponds to a cylindrical boss part 11 having a hollow portion (boss hole) 12 in which the negative electrode current collector 6 is press-fitted. A film-shaped part (hereinafter, referred to as the partition part) 13 lying from the outer periphery of the boss part 11 to the rim of the disc tightly closes the space in the battery can 2 housing the power generation element.

Meanwhile, in a region 16, opposed to the negative electrode gel 5, in the partition part 13 of the sealing gasket 10, a groove-shaped thin-walled portion 15 is formed to be concentric with the boss part 11. In the example illustrated in FIG. 2, the thin-walled portion 15 is formed along the outer periphery of the boss part 11. This thin-walled portion 15 functions as an explosion-proof safety mechanism that fractures prior to fracture of other portions of the sealing gasket 10 when the internal pressure of the battery can 2 rises abnormally, and eventually releases the gas that causes the abnormal internal pressure to the atmosphere through vent hole(s) 9 provided in the negative terminal plate 7. Note that a structure of the alkaline battery 1 and a manufacturing method thereof are described in Non Patent Literature 1 (for example, FDK CORPORATION "Process for Producing Alkaline Battery", retrieved online Nov. 4, 2016 at www.fdk.co.jp/denchi club/denchi story/arukarari. Also, commercially available alkaline batteries 1 are also described in Non Patent Literature 2 (FDK CORPORATION "Alkaline Dry Battery-Premium Type", retrieved online Nov. 4, 2016 at www.fdk.co.jp/denchi/premium/index.

Figure 3:
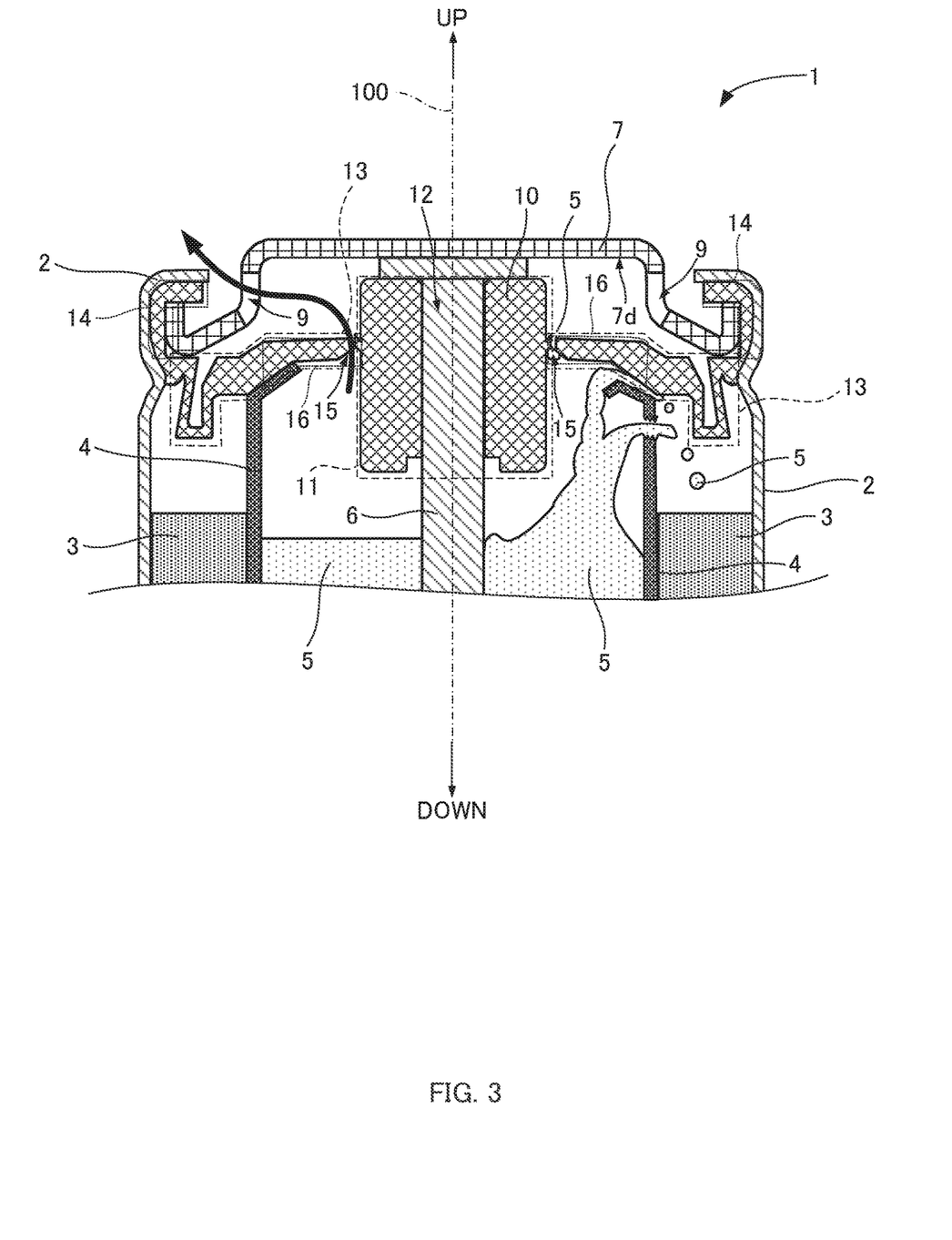
FIG. 3 is a diagram illustrating an explosion-proof safety mechanism in an alkaline battery.

In the alkaline battery 1, the thin-walled portion 15 is formed in the partition part 13 of the sealing gasket 10 as an explosion-proof safety mechanism. The explosion-proof safety mechanism is activated if gas is generated inside the battery can 2 due to charging of the alkaline battery 1, which is a primary battery, or the like and reaches a predetermined pressure. At the same time, however, the separator 4 may be damaged and an internal short circuit may occur. FIG. 3 is a diagram illustrating the operation of the explosion-proof safety mechanism in the alkaline battery 1. FIG. 3 is an enlarged longitudinal cross-sectional view of the upper end side of the alkaline battery 1. In FIG. 3, an internally short-circuited state is illustrated on the right side of the drawing sheet relative to the cylinder axis 100 of the battery can 2. Once the explosion-proof safety mechanism is activated, the gas passes through the fractured thin-walled portion 15 in the sealing gasket 10 and is released through the vent hole(s) 9 formed in the negative terminal plate 7, as indicated by the bold arrow. However, since the fractured part of the thin-walled portion 15 is a narrow groove-shaped opening, the negative electrode gel 5 moving together with the escaping gas is blocked by the partition part 13 and loses a place to go. Then, the negative electrode gel 5 having lost a place to go may fracture the separator 4, flow out into the region housing the positive electrode mixture 3, and directly contact a positive electrode mixture 3, which may causes an internal short circuit.

In view of the above, an object of the present disclosure is to provide a sealing gasket 10 of a cylindrical alkaline battery 1 capable of guiding the negative electrode gel 5 to the upper surface side of the partition part 13 when the thin-walled portion 15 fractures, to thereby prevent the negative electrode gel 5 from flowing into the region housing the positive electrode mixture 3 and thus prevent an internal short circuit caused by contact between the negative electrode gel 5 and the positive electrode mixture 3; and a cylindrical alkaline battery 1 comprising the sealing gasket 10.

SUMMARY

A main aspect of the present disclosure for achieving an object described above is a sealing gasket for a cylindrical alkaline battery, the alkaline battery including an annular positive electrode mixture, a cylindrical separator closed at a bottom, the separator disposed inside the positive electrode mixture, a negative electrode gel disposed inside the separator, a cylindrical battery can closed at a bottom and open at a top, the battery can having a cylinder axis in a vertical direction, a negative electrode terminal plate to be fitted in an opening end portion of the battery can, and a rod-shaped negative electrode current collector, the positive electrode mixture, the separator, and the negative electrode gel being housed in the cylindrical battery can as a power generation element, the sealing gasket configured to be incorporated in the alkaline battery to insulate the opening end portion of the battery can and the negative electrode terminal plate from each other, the sealing gasket comprising: assuming that an upper side and a lower side of the sealing gasket correspond to an upper side and a lower side of the battery can, respectively: a resin boss part formed in a hollow cylindrical shape in the vertical direction such that the negative electrode current collector can stand; a disc-shaped partition part coupled to an outer periphery of the boss part; an outer periphery part standing upward from an outer rim of the partition part; and a thin-walled portion formed in the partition part in a groove shape to be concentric with the boss part, the thin-walled portion being formed in a region opposed to the negative electrode gel in the partition part in a state where the sealing gasket is incorporated in the alkaline battery, the thin-walled portion being thinner than another region in the partition part, the thin-walled portion having a thickness such that the thin-walled portion fractures when a pressure inside the battery can reaches a predetermined pressure in the state where the sealing gasket is incorporated in the alkaline battery, the region opposed to the negative electrode gel in the partition part including an annular breakage region having a thickness of 0.3 mm or smaller, the breakage region having a projected area, when seen from the vertical direction, equal to or greater than 25% of a projected area of entirety of the region opposed to the negative electrode gel. Further, it is suitable that the sealing gasket is to be incorporated in a cylindrical alkaline battery of an LR6 size or smaller.

Further, the present disclosure includes a cylindrical alkaline battery comprising: an annular positive electrode mixture; a cylindrical separator closed at a bottom, the separator disposed inside the positive electrode mixture; a negative electrode gel disposed inside the separator; a cylindrical battery can closed at a bottom and open at a top; and a negative electrode terminal plate to be fitted in an opening end portion of the battery can, the positive electrode mixture, the separator, the negative electrode gel being housed in the cylindrical battery can as a power generation element, the negative electrode terminal plate being fitted in the opening end portion of the battery can, with any one of the aforementioned sealing gaskets for an alkaline battery interposed therebetween.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a sealing gasket for a cylindrical alkaline battery and the cylindrical alkaline battery according to embodiments of the present disclosure are described. As used herein, the singular forms "a", "an", and "the" are intended to include the plural forms as well, unless the context clearly indicates otherwise.

Explosion-Proof Safety Mechanism

As mentioned above, in the sealing gasket 10 of the alkaline battery 1, when the pressure inside the battery can 2 rises to a predetermined pressure in the state where the sealing gasket 10 is incorporated in the battery can 2, that pressure fractures the groove-shaped thin-walled portion 15. However, the thin-walled portion 15 opens in a form of a narrow groove, and thus the gas causing the rise in internal pressure can be released but the negative electrode gel 5 trying to flow out together with the gas is blocked by the partition part 13.

Accordingly, the present disclosure has assumed that the negative electrode gel 5 could be guided above the partition part 13 of the sealing gasket 10, if it is possible to fracture the thin-walled portion 15 first and then fracture a portion other than the thin-walled portion 15 in the partition part 13 as well from the fractured thin-walled portion as a starting point, thereby opening the partition part 13 not in a linear manner but in a planar manner. Then, the present disclosure has intensively worked on a structure to fracture the thin-walled portion 15 first and opening the partition part 13 in a planar manner when the internal pressure of the battery can 2 rises, and has achieved the present disclosure.

Embodiment

An embodiment of the present disclosure will be described below with reference to accompanying drawings.

Note that in the drawings used in the following description, identical or similar parts are designated by identical reference numerals, and overlapping description may be omitted. In some of the drawings, unnecessary reference numerals may be omitted for the sake of explanation.

A sealing gasket 10 of an alkaline battery 1 according to an embodiment of the present disclosure (hereinafter also referred to as the sealing gasket 10) has a shape and basic structure similar to those of the sealing gasket 10 used in the alkaline battery 1 illustrated in FIGS. 1 and 2. However, the thickness of the region 16 opposed to the negative electrode gel 5 in the partition part 13 of the sealing gasket 10 is optimized. As a result, even when the internal pressure of the battery can 2 abruptly rises, the partition part 13 is opened (hereinafter also referred to as break/breakage) in a planar manner, without blockage in the fractured thin-walled portion 15, so that the negative electrode gel 5 can be reliably guided above the partition part 13.

Figure 4:
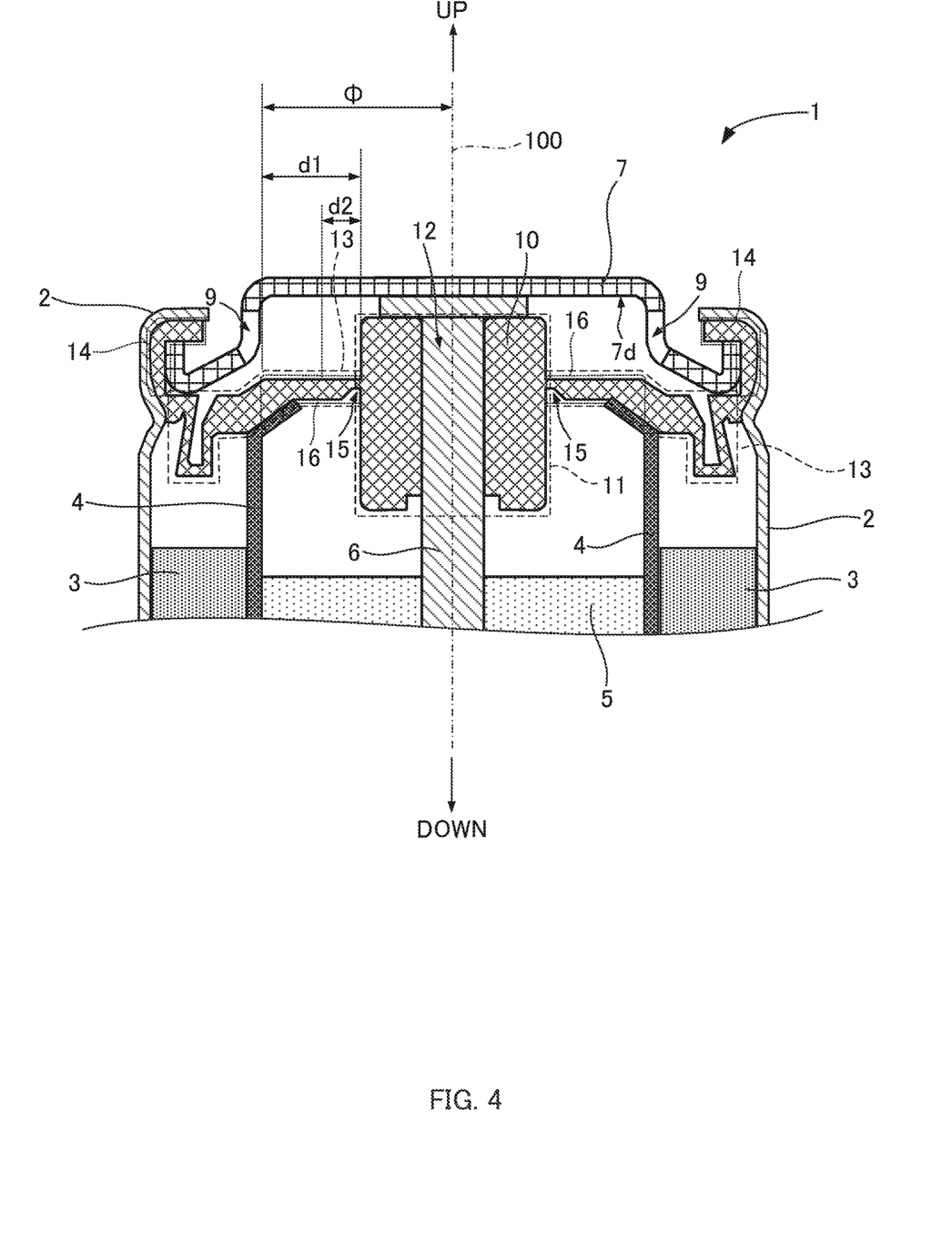
FIG. 4 is a diagram illustrating a structure of a sealing gasket in an alkaline battery.

FIG. 4 is a diagram illustrating the operation of the explosion-proof safety mechanism provided by the sealing gasket 10 according to an embodiment of the present disclosure. FIG. 4 is an enlarged longitudinal cross-sectional view of the upper end side of the alkaline battery 1. The sealing gasket 10 in this embodiment is formed such that part or the entirety of the region 16 opposed to the negative electrode gel 5 in the partition part 13 in the state where the sealing gasket 10 is incorporated in the alkaline battery 1, has a predetermined thickness or smaller. Accordingly, when the thin-walled portion 15 fractures due to a rise in internal pressure of the battery can 2, the region having the predetermined thickness or smaller (hereinafter also referred to as the breakage region) cracks from the fractured part of the thin-walled portion 15. As a result, a part of the partition part 13 is ripped to be opened and/or a part of the partition part 13 is ruptured, resulting in a hole, so that the partition part 13 becomes a broken state where it is opened in a planar manner.

<Thickness of Breakage Region>

First, in order to obtain thicknesses that ensure breakage of the partition part 13, a plurality of types of the sealing gasket 10 for an LR6 alkaline battery differing from each other in the thickness of the breakage region are prepared, and LR6 alkaline batteries 1 are prepared as samples by using these types of sealing gaskets 10, differing in the thickness of the aforementioned breakage region. Also, 20 samples using the same sealing gasket 10 are prepared for each type. Then, an explosion-proof safety test is conducted where each sample is charged with a current of 150 mA to fracture the thin-walled portion 15. Then, whether or not an internal short circuit has occurred is checked. Also, each sample having been subjected to the test is disassembled and the fractured state of the sealing gasket 10 is visually checked.

Note that, in the sealing gasket 10 used in each sample, the breakage region has a constant thickness across the entire region excluding the thin-walled portion 15. The thickness of the thin-walled portion 15 is set to a predetermined thickness of 0.15 to 0.20 mm in accordance with the desired operating pressure at which the thin-walled portion 15 is to break, and here is set to 0.15 mm for all the sealing gaskets 10 in this test. The thickness of the thin-walled portion 15 is not limited to this thickness, as a matter of course, as long as the thin-walled portion 15 is formed to be thinner than other portions in the partition part 13 and configured to fracture prior to fracture of other portions in the partition part 13.

Meanwhile, the sealing gasket 10 used in each sample has a configuration and structure similar to those in commercially available products (e.g., the alkaline dry battery 1 described in NPL 2 mentioned above) except the thickness of the breakage region. Specifically, the sealing gasket 10 is a molded product made of nylon 6-12, and an inner diameter $\phi$ of the separator 4 in FIG. 4, i.e., the opposed region 16 opposed to the negative electrode gel 5 in the sealing gasket 10 is set as $\phi=10$ mm.

Table 1 below shows the result of the explosion-proof safety test.

TABLE 1

| Sample type | Thickness of region excluding thin-walled portion in breakage region (mm) | Internal short circuit (%) | State of fracture of partition part |
|---|---|---|---|
| 1 | 0.20 | 0 | Broken |
| 2 | 0.25 | 0 | Broken |
| 3 | 0.30 | 0 | Broken |
| 4 | 0.35 | 10 | Only thin-walled portion was fractured |
| 5 | 0.40 | 30 | Only thin-walled portion was fractured |

As shown in table 1, in sample types 1 to 3 in which the thickness of the breakage region in the partition part 13 is 0.3 mm or smaller, no internal short circuit has occurred in any of the 20 samples in each sample type. Also, as for the state of fracture of the partition part 13, it has been found that cracking and/or chipping continued from the fractured part of the thin-walled portion 15 has occurred and resulted in breakage. On the other hand, in sample types 4 and 5 in which the thicknesses are 0.35 mm and 0.4 mm, respectively, an internal short circuit has occurred in 10% and 30% of 20 samples in these sample types, respectively. Further, when checking the state of fracture in the sealing gasket 10 of each of the sample types 4 and 5, it has been found that only the thin-walled portion 15 has been fractured while the partition part 13 has not been broken.

Figure 5:
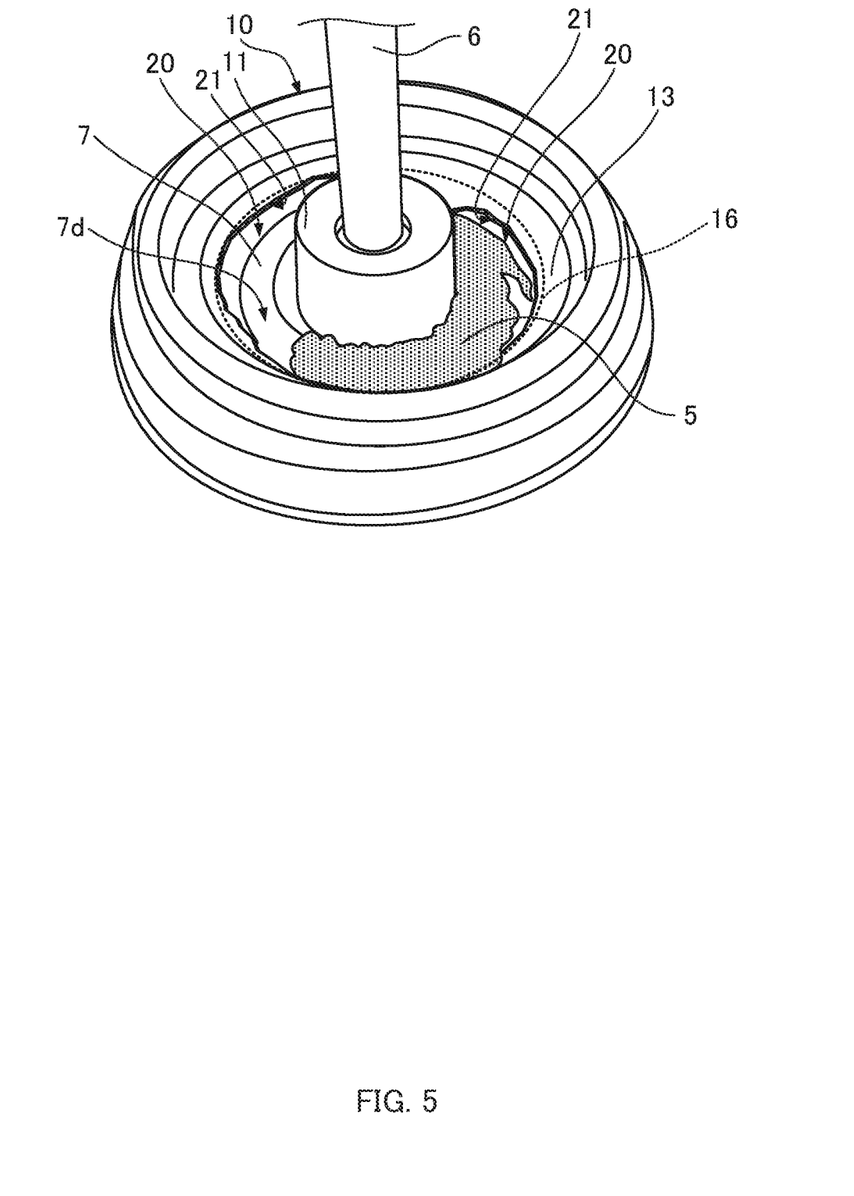
FIG. 5 is a diagram illustrating a fractured state of a sealing gasket.

FIG. 5 illustrates a state of fracture of the sealing gasket 10 in a sample having been subjected to the explosion-proof safety test. FIG. 5 is a diagram of a sealing member including a negative terminal plate 7, a negative electrode current collector 6, and the sealing gasket 10, when seen from below, and here illustrates the state of fracture of the sealing gasket 10 in a sample of the sample type 3. As illustrated in FIG. 5, in the sealing gasket 10 incorporated in the sample of the sample type 3, in which no short circuit has occurred in any of the samples, a large part of the region 16 opposed to the negative electrode gel 5 in the partition part 13 has been lost. In this example, substantially the entire region 16 opposed to the negative electrode gel 5 has been broken. A C-shaped part of the annular opposed region 16 surrounding the outer periphery of the boss part 11 has been fallen off, except for a remaining part thereof, so that the lower surface 7d of the negative terminal plate 7 has been exposed from a resultant C-shaped opening 20. It can also be found that the negative electrode gel 5 has been guided to the upper surface of the partition part 13 from the opening 20. Note that a fractured surface 21 of the broken region is hatched in FIG. 5.

On the other hand, in the sealing gaskets 10 in the samples in which an internal short circuit has occurred, the partition part 13 has not broken and the negative electrode gel 5 has adhered to the partition part 13. Specifically, in the samples in which an internal short circuit has occurred, it has been found that the partition part 13 has not broken and only the thin-walled portion 15 has fractured in a linear manner, so that the negative electrode gel 5 has not passed through the fractured part of the thin-walled portion 15 but has damaged the separator 4 to flow out to the positive electrode mixture 3 side. As has been described above, the thickness of the breakage portion in the region 16 opposed to the negative electrode gel 5 in the partition part 13 of the sealing gasket 10 needs to be set to 0.3 mm or smaller so that the partition part 13 breaks when the explosion-proof safety mechanism of the alkaline battery 1 is activated.

<Occupancy of Breakage Region>

Next, LR6 alkaline batteries 1 are prepared using sealing gaskets 10 in which a part of the opposed region 16 is formed as a breakage region. Then, an explosion-proof safety test has been conducted on those alkaline batteries 1. Specifically, in FIG. 4, prepared are various sealing gaskets 10 that have a thickness of 0.3 mm or smaller in a region across a distance d2 (≤d1) from the inner periphery of the thin-walled portion toward the outer side, in a distance d1 from the inner periphery of the thin-walled portion to the outer periphery of the region 16 opposed to the negative electrode gel 5 in the partition part 13, i.e., to the position of the inner surface of the separator 4, and which differ from each other in the distance d2. In short, prepared are a plurality of types of sealing gaskets 10 that differ from each other in the ratio of the projected area of the breakage region having a thickness of 0.3 mm or smaller to the projected-area of the entire opposed region 16 when seen from the vertical direction (hereinafter, referred to as the occupancy). Then, LR6 alkaline batteries 1 are prepared, as samples, using these types of sealing gaskets 10, differing in the occupancy of the breakage region, and the above explosion-proof safety test has been conducted on these samples. In this example as well, 20 samples are prepared for each sample type. Table 2 below shows the occupancy of the breakage region and the result of the explosion-proof safety test.

TABLE 2

| Sample Type | Occupancy (%) | Internal short circuit (%) |
| --- | --- | --- |
| 6 | 10 | 35 |
| 7 | 15 | 40 |
| 8 | 20 | 15 |
| 9 | 25 | 0 |
| 10 | 30 | 0 |
| 11 | 40 | 0 |

As shown in table 2, in sample types 9 to 11 in which the occupancy of the breakage region is 25% or greater, no internal short circuit has occurred in any of the 20 samples in each sample type. On the other hand, in sample types 6 to 8 in which the occupancy is 20% or smaller, there are some samples in which an internal short circuit has occurred. Also, of the sample types 6 and 7 having occupancy of 10% and 15%, respectively, the sample type 7 having the higher occupancy has a higher rate of occurrence of an internal short circuit. This indicates that when the occupancy is 15% or smaller, the breakage condition is not stable, which makes it more difficult to prevent an internal short circuit. From the results of the explosion-proof safety tests shown in Tables 1 and 2, it has been found that an internal short circuit can be reliably prevented when the region 16 opposed to the negative electrode gel 5 in the partition part 13 of the sealing gasket 10 includes a breakage region having a thickness of 0.3 mm or smaller and an occupancy of 25% or greater.

Other Embodiments

In the sealing gasket 10 in an embodiment described above, the thin-walled portion 15 is formed along the outer periphery of the boss part 11. However, the thin-walled portion 15 only needs to be formed to be concentric with the boss part 11 in the region opposed to the negative electrode gel 5 in the state where the sealing gasket 10 is incorporated in the alkaline battery 1. Moreover, the breakage region only needs to be formed in an annular shape in abutment with the thin-walled portion 15. For example, an annular breakage region may be provided along the outer periphery of the boss part 11, and the thin-walled portion 15 may be provided along the outer periphery of that breakage region. Two breakage regions may be formed on the outer periphery side and the inner periphery side of the thin-walled portion 15 in the region opposed to the negative electrode gel 5 in the partition part 13. In other words, the breakage region may be divided by the thin-walled portion 15 into two annular regions on the inner periphery side and the outer periphery side.

Note that the above embodiments are intended to facilitate the understanding of the present disclosure and not intended to interpret the present disclosure in a limited manner. The present disclosure can be changed and modified without departing from its gist, and the present disclosure includes equivalents thereof.

For example, the configurations and structures of the sealing gaskets 10 in the above embodiments are not limited to LR6 alkaline batteries 1 but are applicable to any types of cylindrical alkaline batteries 1. It is only needed that a thin-walled portion 15 that fractures under a predetermined pressure and an annular breakage region in abutment with the thin-walled portion 15 are formed in the region opposed to the negative electrode gel 5 in the partition part 13.

With the sealing gasket for a cylindrical alkaline battery according to the present disclosure, it is possible to prevent the negative electrode gel from flowing out into the region housing the positive electrode mixture, when the thin-walled portion fractures in the state where the sealing gasket is incorporated in the battery can and the gas inside the battery is released. Further, the alkaline battery according to the present disclosure comprising this sealing gasket is a battery in which an internal short circuit caused by contact between the negative electrode gel and the positive electrode mixture is unlikely to occur.

What is claimed is:
1. A cylindrical alkaline battery comprising:
an annular positive electrode mixture;
a cylindrical separator closed at a bottom, the separator disposed inside the positive electrode mixture;
a negative electrode gel disposed inside the separator;
a cylindrical battery can closed at a bottom and open at a top;
a negative electrode terminal plate fitted in an opening end portion of the battery can; and
a rod-shaped negative electrode current collector,
the positive electrode mixture, the separator, the negative electrode gel being housed in the cylindrical battery can as a power generation element,
the negative electrode terminal plate being fitted in the opening end portion of the battery can, with a sealing gasket interposed therebetween to insulate the opening end portion of the battery can and the negative electrode terminal plate from each other, wherein the sealing gasket includes:

an upper side and a lower side corresponding to an upper side and a lower side of the battery can, respectively;

a resin boss part formed in a hollow cylindrical shape in the vertical direction, such that the negative electrode current collector can stand upright by being press-fitted into the boss part;

a disc-shaped partition part coupled to an outer periphery of the boss part;

an outer periphery part projecting upward from an outer rim of the partition part; and an annular thin-walled portion formed in the partition part, the annular thin-walled portion having a groove shape and encircling the boss part so as to be concentric with the boss part, the thin-walled portion being formed in a region opposed to the negative electrode gel in the partition part, the thin-walled portion being a portion of reduced thickness thinner than another region in the partition part, the region opposed to the negative electrode gel in the partition part including an annular breakage region formed around the outer periphery of the boss part, with the thin-walled portion formed around the outer periphery of the breakage region, the breakage region having a thickness greater than a thickness of the thin-walled portion and occupying at least 25% of a projected area of entirety of the region opposed to the negative electrode gel when viewed from the vertical direction, wherein the thin-walled portion has a thickness such that the thin-walled portion fractures when a pressure inside the battery can reaches a predetermined pressure, such that substantially the entire breakage region ruptures thereby preventing the negative electrode gel from contacting the positive electrode mixture, the entirety of the region opposed to the negative electrode gel excluding the thin-walled portion has a constant thickness, the breakage region has a thickness of 0.3 mm or less but greater than 0.2 mm and the thin-walled portion has a thickness of 0.15-0.2 mm, and the region opposed to the negative electrode gel is bent at an angle to the separator.

2. The cylindrical alkaline battery according to claim 1, wherein the battery is an LR6 size or smaller.

* * * * *